(12) United States Patent
Nakagawa

(10) Patent No.: US 10,613,639 B2
(45) Date of Patent: Apr. 7, 2020

(54) OPERATION DEVICE

(71) Applicant: DENSO CORPORATION, Kariya, Aichi-pref. (JP)

(72) Inventor: Kunihiro Nakagawa, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/249,990

(22) Filed: Jan. 17, 2019

(65) Prior Publication Data

US 2019/0146594 A1    May 16, 2019

Related U.S. Application Data

(63) Continuation of application No. PCT/JP2017/022087, filed on Jun. 15, 2017.

(30) Foreign Application Priority Data

Jul. 20, 2016   (JP) .................................. 2016-142083
May 18, 2017   (JP) .................................. 2017-099235

(51) Int. Cl.
*G06F 3/02*      (2006.01)
*G06F 3/044*     (2006.01)
*G06F 3/0354*    (2013.01)
*G06F 3/0362*    (2013.01)
*G06F 3/041*     (2006.01)
*G06F 3/039*     (2013.01)

(52) U.S. Cl.
CPC ............ *G06F 3/0202* (2013.01); *G06F 3/039* (2013.01); *G06F 3/0362* (2013.01); *G06F 3/03547* (2013.01); *G06F 3/041* (2013.01); *G06F 3/044* (2013.01); *G06F 2203/04103* (2013.01)

(58) Field of Classification Search
CPC .. G06F 3/0202; G06F 3/03547; G06F 3/0362; G06F 3/039; G06F 3/041; G06F 3/044; G06F 2203/04103
See application file for complete search history.

(56) References Cited

U.S. PATENT DOCUMENTS

2017/0052617 A1    2/2017   Okuzumi et al.

FOREIGN PATENT DOCUMENTS

| JP | 2007080778 A | 3/2007 |
| JP | 2012035782 A | 2/2012 |
| WO | WO-2015174092 A1 | 11/2015 |
| WO | WO-2017183408 A1 | 10/2017 |

*Primary Examiner* — Stacy Khoo
(74) *Attorney, Agent, or Firm* — Harness, Dickey & Pierce, P.L.C.

(57) ABSTRACT

The present disclosure provides an operation device including a touch panel and a mechanical switch. The mechanical switch includes a fixed part, a rotary part, an electrode, and a conductive member. The electrode is provided on an opposing surface of the rotary part facing the touch panel. The conductive member circumferentially coating an outer circumferential surface of the rotary part and connected to the electrode. The conductive member is provided in a first region of the outer circumferential surface except for a region within a predetermined dimension from the opposing surface in a direction away from the touch panel. The conductive member is further provided in a second region of the outer circumferential surface extending from the first region and connected to the electrode.

5 Claims, 6 Drawing Sheets

OPERATION DEVICE

CROSS REFERENCE TO RELATED APPLICATIONS

The present application is a continuation application of International Patent Application No. PCT/JP2017/022087 filed on Jun. 15, 2017, which designated the United States and claims the benefit of priority from Japanese Patent Application No. 2016-142083 filed on Jul. 20, 2016 and Japanese Patent Application No. 2017-099235 filed on May 18, 2017. The entire disclosures of all of the above applications are incorporated herein by reference.

TECHNICAL FIELD

The present disclosure relates to an operation device having a mechanical switch provided on a touch panel.

BACKGROUND

An operation device includes a touch panel that allows for inputs by touch operation and a mechanical switch that is fixed to the touch panel and allows for inputs to the touch panel.

SUMMARY

The present disclosure provides an operation device including a touch panel and a mechanical switch. The mechanical switch includes a fixed part, a rotary part, an electrode, and a conductive member. The electrode is provided on an opposing surface of the rotary part facing the touch panel. The conductive member circumferentially coating an outer circumferential surface of the rotary part and connected to the electrode. The conductive member is provided in a first region of the outer circumferential surface except for a region within a predetermined dimension from the opposing surface in a direction away from the touch panel. The conductive member is further provided in a second region of the outer circumferential surface extending from the first region and connected to the electrode.

BRIEF DESCRIPTION OF THE DRAWINGS

The above and other objects, features and advantages of the present disclosure will become more apparent from the following detailed description made with reference to the accompanying drawings in which.

DETAILED DESCRIPTION

Figure 1:
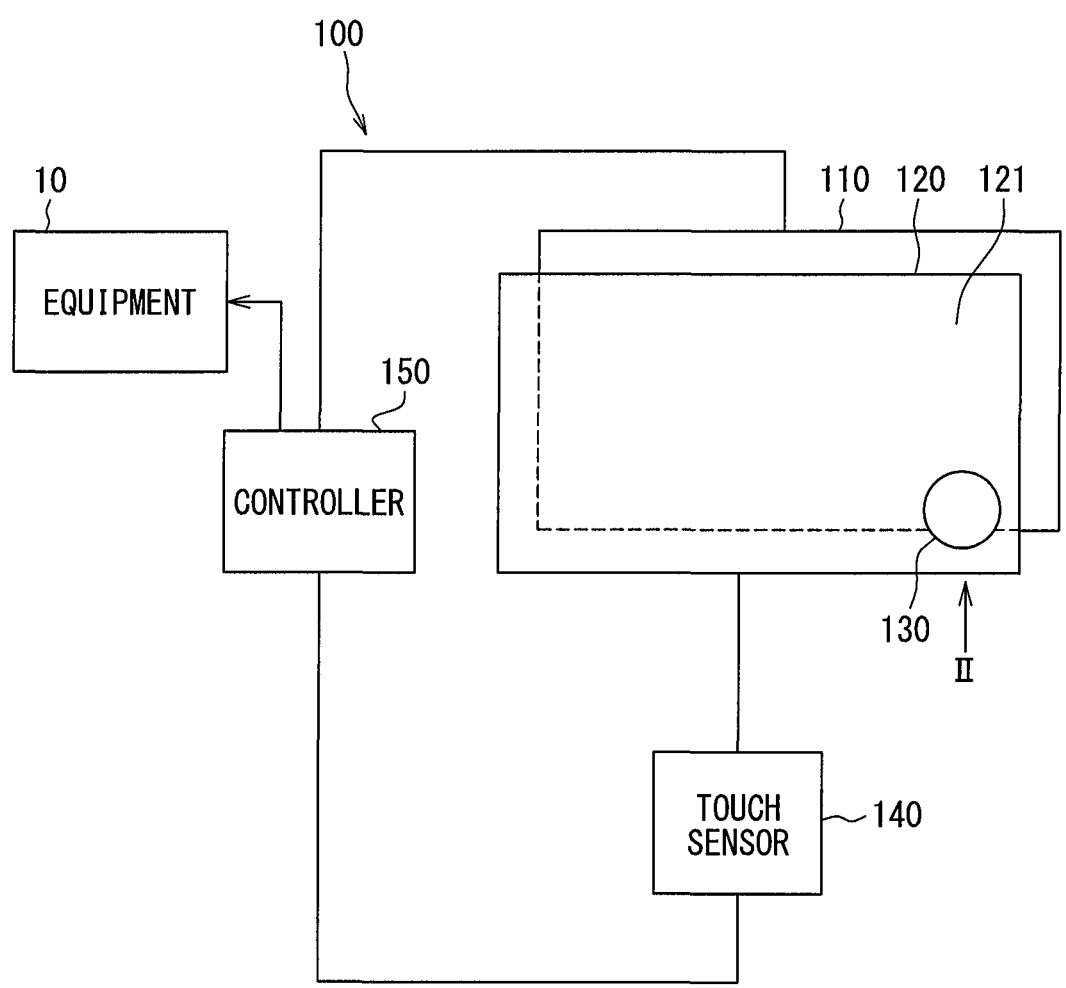
FIG. 1 is an illustrative diagram showing the entire structure of an operation device in a first embodiment.

Hereinafter, several embodiments of the present disclosure will be described with reference to the drawings. Parts corresponding to the matter described in preceding embodiments may be given the same reference numerals in subsequent embodiments to avoid repeated description. Where only some components of a configuration are described in various embodiments, corresponding parts of preceding embodiments may apply to the other components of the configuration. Parts of various embodiments can be combined where it is explicitly indicated that specific combinations are possible. In addition, the embodiments can be partly combined even when not clearly suggested, if such combinations are possible without difficulty.

First Embodiment

An operation device 100 of a first embodiment will be described with reference to FIG. 1 to FIG. 4. The operation device 100 is supposed to be used for vehicles, for example. The operation device 100 enables a user to perform touch operations with a finger and switch operations of a mechanical switch 130 to a touch panel 120. Based on these operations, a controller 150 controls display states of images on a display 110, sets (in other words, inputs) operating conditions of predetermined equipment 10 mounted on the vehicle, and manages the operating states. The predetermined equipment 10 includes, for example, a car air conditioner, a car audio device, and a car navigation system.

The operation device 100 includes the display 110, the touch panel 120, the mechanical switch 130, a touch sensor 140, a controller 150, and so on, as shown in FIG. 1. The display 110, the touch panel 120, and the mechanical switch 130 configure an input unit, which is placed in a central part, for example, of an instrument panel of the vehicle so that it is easy for the user to see and operate (e.g., perform touch operations and switch operations). The touch sensor 140 and the controller 150 are disposed inside the instrument panel.

The display 110 is an image display device having a rectangular (e.g., quadrilateral) front shape that is horizontally long as viewed by the user, and configured by a liquid crystal display, an organic EL display, or the like, for example. The display 110 shows various icons or the like as images for allowing inputs of operating states and conditions of predetermined equipment 10 by the controller 150. The various icons include menu icons roughly classifying input items and setting icons for allowing setting of more specific operating conditions in a hierarchical manner, and are displayed in a predetermined region of the display surface of the display 110.

The touch panel 120 allows for touch operations (e.g., touch inputs) by the user with a finger. The touch panel 120 also allows for inputs based on switch operations of the mechanical switch 130. The touch panel 120 is a transparent, plate-like sensing unit that is rectangular (e.g., quadrilateral) corresponding to the display surface of the display 110, and layered on the display surface (e.g., front surface) of the display 110. One side of the touch panel 120 where the touch operations and switch operations are performed (e.g., front surface facing the user) is a touch surface 121. The operating states of the predetermined equipment 10, various icons, and the like on the display 110 are viewable by the user through the touch panel 120.

Various types of touchscreens can be used for the touch panel 120, including, for example, capacitive touchscreens, resistive touchscreens, surface acoustic wave touchscreens, optical touchscreens, electromagnetic touchscreens, and so on. In this embodiment, a capacitive (e.g., self-capacitive) touchscreen is used as the touch panel 120. The capacitive touch panel 120 has a plurality of transparent electrodes arrayed in a matrix.

The touch panel 120 outputs a change in capacitance (e.g., capacitance change signal) occurring in accordance with the position of the user's finger performing a touch operation to the touch sensor 140. Similarly, the touch panel 120 outputs a change in capacitance (e.g., capacitance change signal) occurring in accordance with the position of an electrode 134, which will be described later in detail, as the user performs a switch operation using the mechanical switch 130 to the touch sensor 140.

The mechanical switch 130 is a switch for giving inputs to the touch panel 120. The mechanical switch 130 has a flat cylindrical shape as a whole, for example, and is provided to a predetermined point on the touch panel 120 as a rotary switch that allows for input operations to the predetermined equipment 10 by rotation operations by the user, as will be described later. Here, as shown in FIG. 1, the mechanical switch 130 is provided in a lower right part within the touch surface 121 of the touch panel 120.

The mechanical switch 130 is a switch for adjusting operation settings of the predetermined equipment 10. For example, if the predetermined equipment 10 is a car air conditioner, the mechanical switch 130 is a switch for adjusting temperature settings as the operation settings, or, a switch for adjusting air volumes as the operation settings. In each case, when the mechanical switch 130 is rotated leftward (i.e., counterclockwise), the operation setting is changed to reduce, and when rotated rightward (i.e., clockwise), the operation setting is changed to increase.

Figure 2:
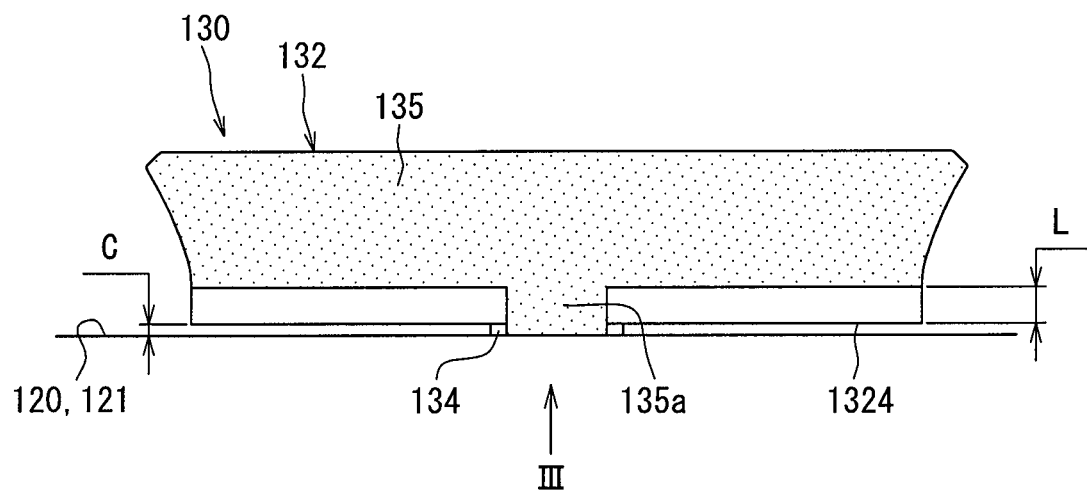
FIG. 2 is a view showing a mechanical switch taken in a direction of arrow II in FIG. 1.
Figure 3:
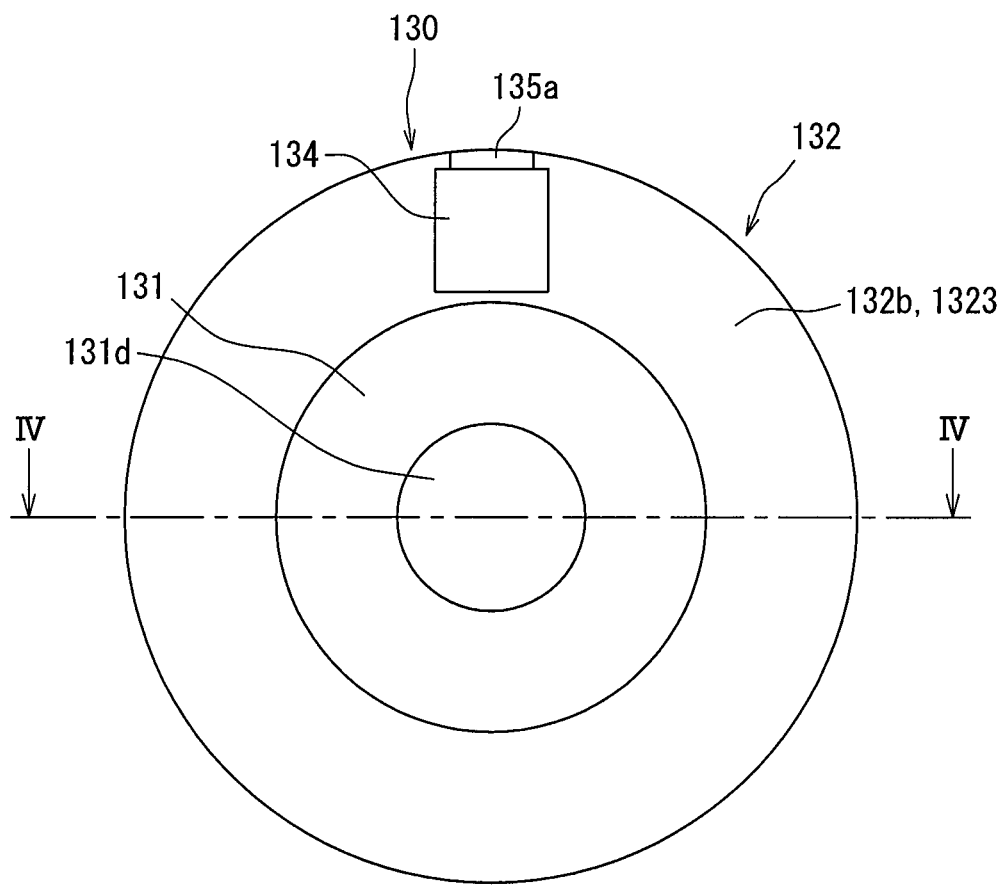
FIG. 3 is a view showing the mechanical switch taken in a direction of arrow III in FIG. 2.
Figure 4:
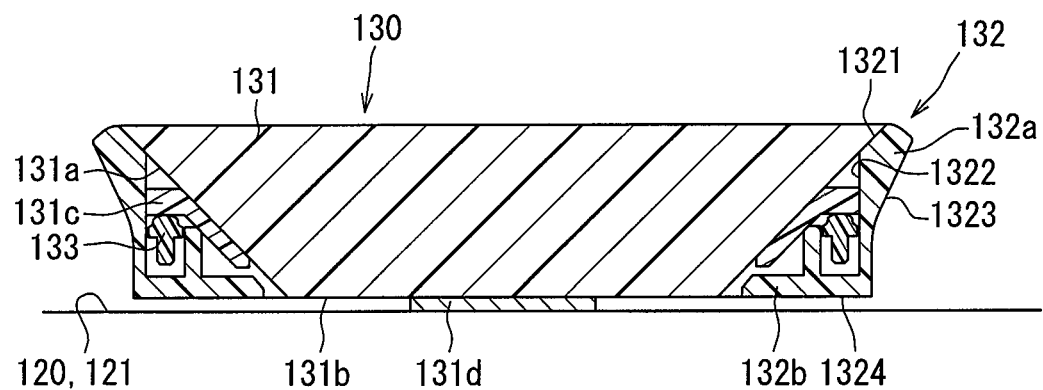
FIG. 4 is a cross-sectional view showing the mechanical switch taken along a line IV-IV in FIG. 3.

The mechanical switch 130 includes a fixed part 131, a rotary part 132, a click pin 133, an electrode 134, a conductive member 135, and so on, as shown in FIG. 2 to FIG. 4.

The fixed part 131 is a rotation shaft of the mechanical switch 130, and has an outer circumferential surface 131a having a shape that forms part of a cone with its outer diameter increasing in a direction away from the touch panel 120. The fixed part 131 is formed from a light transmissive (i.e., transparent) resin material, for example. The fixed part 131 has a bottom surface 131b on the side facing the touch panel 120. A radially outwardly extending and circumferentially arranged click plate 131c is fixed on the outer circumferential surface 131a. The click plate 131c has circumferentially continuous recesses and protrusions on the surface facing the touch panel 120. A double-sided tape 131d, for example, is provided in a central part of the bottom surface 131b, so that this double-sided tape 131d secures the fixed part 131 on the touch surface 121 of the touch panel 120. For fixedly attaching the fixed part 131 to the touch surface 121, adhesive, a magnet, or the like may be used other than the double-sided tape 131d.

The rotary part 132 is a flat cylindrical member supported rotatably relative to the outer circumferential surface 131a of the fixed part 131. It is formed from a non-conductive material such as resin, for example. The rotary part 132 includes a flat cylindrical main body 132a, and a bottom plate 132b extending from one end of the main body 132a facing the touch panel 120 along the touch surface 121 toward the center of the main body 132a.

The main body 132a has an inner circumferential surface 1321 making contact with the outer circumferential surface 131a of the fixed part 131 on the inner side at the opposite end from the touch panel 120. The inner circumferential surface 1321 is the surface that slides on the outer circumferential surface 131a when the rotary part 132 is rotated. Another inner circumferential surface 1322 is formed on one side of the inner circumferential surface 1321 closer to the touch panel 120. The inner circumferential surface 1322 is a surface extending from the inner circumferential surface 1321 vertically toward the touch panel 120. A distal end portion of the click plate 131c is in contact with the inner circumferential surface 1322. The outside surface of the main body 132a forms an outer circumferential surface 1323.

The bottom plate 132b forms an opposing surface 1324 facing the touch panel 120. A gap between the touch panel 120 and the opposing surface 1324 is not more than a predetermined gap C. The predetermined gap C is a gap of about 0.5 mm, for example. Namely, the main body 132a is disposed such that its end extending toward the touch panel 120 is positioned in close proximity to the touch surface 121.

The click pin 133 is a member that gives the user a clicking feeling when the user rotates the rotary part 132. One end of the click pin 133 is fixed to the bottom plate 132b via a biasing member that is not shown. Therefore, the click pin 133 rotates (in other words, moves) with the rotary part 132. The other distal end of the click pin 133 is pressed against the recesses and protrusions on the click plate 131c by a biasing member. Here, two click pins 133 are provided opposite each other in the circumferential direction of the bottom plate 132b. When the rotary part 132 is rotated, the distal ends of the click pins 133 move on the recesses and protrusions of the click plate 131c, whereby a click feeling is achieved.

The electrode 134 is a member for allowing the rotating position of the mechanical switch 130 to be input to (e.g., detected by) the touch panel 120. The electrode 134 is formed by a rectangular conductive plate member, and corresponds to the finger tip of the user performing touch operations. The electrode is fixed (e.g., bonded) to the opposing surface 1324 of the bottom plate 132b. The electrode 134 has a surface opposite the touch panel 120 in contact with the touch surface 121. The electrode 134 is configured to move on the touch surface 121 with the rotary part 132 when the rotary part 132 is rotated.

The conductive member 135 is provided as a coating all around on the outer circumferential surface 1323 of the rotary part 132 and connected to the electrode 134. A portion of the conductive member 135 connected to the electrode 134 constitutes a connector 135a. For the conductive member 135, for example, Cu materials, Cu—Ni materials, Cu—Ni—Cr materials, or the like are used. The conductive member 135 is provided as a coating on the outer circumferential surface 1323 by plating, painting, deposition, printing, and so on.

When the user pinches the mechanical switch 130 (e.g., outer circumferential surface 1323), the user's finger becomes electrically connected to the electrode 134 because of the conductive member 135. Namely, as the user pinches the mechanical switch 130 and performs a switching operation, changes in capacitance occur in the touch panel 120 through the electrode 134 (e.g., in accordance with the position of the electrode 134).

In this embodiment, the coating of the conductive member 135 is formed on the outer circumferential surface 1323 of the rotary part 132 not entirely but in a first region except for a region L within a predetermined dimension from the opposing surface 1324 in a direction away from the touch panel 120. The conductive member 135 is further formed in a second region connecting the first region with the electrode 134, i.e., the connector 135*a*. In other words, the coating of the conductive member 135 is not formed in the region L within the predetermined dimension except for the connector 135*a*. The region L within the predetermined dimension except for the connector 135*a* constitutes a non-coated area of the outer circumferential surface 1323 where the conductive member 135 is not provided. In this embodiment, the region L within the predetermined dimension is a region extending from the opposing surface 1324 over about 1 to 3 mm, for example.

The touch sensor 140 is a device that detects the position of the user's finger, or the position of the electrode 134 of the mechanical switch 130, on the touch panel 120. When a touch operation is performed, the touch sensor 140 detects where the user's finger is located, or moved from where to where on the touch panel 120 based on the signal of change in capacitance output by the touch panel 120, and outputs detection signals (e.g., coordinates of the finger) to the controller 150.

The touch sensor 140 also detects where the electrode 134 is located, or moved from where to where on the touch panel 120 during a switch operation based on the signal of change in capacitance on the touch panel 120 caused by the electrode 134 of the mechanical switch 130, and outputs detection signals (e.g., rotating direction and amount of rotation of the electrode 134) to the controller 150.

The controller 150 controls display of various icons and operating states of the predetermined equipment 10 on the display 110 based on the detection signals output from the touch sensor 140, and controls the operation of the predetermined equipment 10.

The operation device 100 is configured as described above. Below, the operation of the operation device 100 will be described.

Touch operations to the touch panel 120 are operations primarily made by a user with a finger in accordance with the operating states and various icons displayed on the display 110 when the vehicle is stopped, without any driving operations. The user touches a desired icon located on the touch panel 120, whereupon the touch sensor 140 outputs a detection signal (e.g., coordinates of the finger) to the controller 150. The controller 150 controls the display states of the display 110 based on the detection signal (e.g., coordinates of the finger) output from the touch sensor 140, and controls the operation of the predetermined equipment 10.

On the other hand, the switching operations with the use of the mechanical switch 130 is so-called a blind touch operation during driving, in which the user rotates the mechanical switch 130 by feel without looking at the contents of the display 110.

When a switching operation is being performed to the mechanical switch 130, the user's finger pinching the mechanical switch 130 is electrically connected to the electrode 134 via the conductive member 135, so that the touch sensor 140 detects the electrode 134 on the touch panel 120. The touch sensor 140 calculates the rotating direction and the amount of rotation of the mechanical switch 130 from the coordinates of the electrode 134 on the touch panel 120, and outputs detection signals indicative of the rotating direction and the amount of rotation to the controller 150.

The controller 150 controls display of operating states of the predetermined equipment 10 on the display 110 based on the detection signals (e.g., rotating direction and the amount of rotation) output from the touch sensor 140, and controls the operation of the predetermined equipment 10. The controller 150 also changes the operation settings of the predetermined equipment 10 (such as temperature settings, air volumes, and so on) in accordance with the rotating direction and the amount of rotation of the manipulated mechanical switch 130.

Hereinafter, a comparative example of the present disclosure will be described. An operation device (e.g., display device) includes a touch panel (e.g., display panel with touch functions) that displays images and allows for inputs by finger touch operations, and a mechanical switch (e.g., operating knob).

The mechanical switch has a flat cylindrical rotary part (e.g., dial type operation part) supported such as to be rotatable relative to a fixed part (e.g., base part) that is fixedly attached to the touch panel. An end face of the rotary part on the side facing the touch panel is spaced a certain distance away from the touch panel. An electrode (e.g., rotation transmitting part) is provided to the rotary part such as to face the touch panel. The electrode is configured to rotate along with the dial type operation part being rotated.

The rotary part and electrode are both made of a conductive material, so that, when an operator touches the rotary part for operation, charges gather to the electrode, as with a fingertip. Thus, when the rotary part is rotated, the electrode is rotated, too, and a sensor of the touch panel detects the position of the electrode.

The mechanical switch of the comparative example has the end face of the rotary part separated a certain distance from the touch panel. In order to hide the inside of the rotary part to improve the appearance, or to prevent entry of dust or the like into the rotary part, for example, the end face of the rotary part could be extended toward the touch panel to reduce the gap to be a predetermined dimension or less. In such a case, since the rotary part is made of a conductive material, the end face of the rotary part may induce responses from the sensor of the touch panel all around, so that the position of the electrode on the touch panel cannot be detected correctly.

According to the present embodiment, the conductive member 135 coats the first region and second region of the outer circumferential surface 1323 even when the gap between the opposing surface 1324 of the rotary part 132 and the touch panel 120 is set to be a predetermined gap C or less. That is, the region L within the predetermined dimension except for the connector 135*a* constitutes a non-coated area of the outer circumferential surface 1323 where the conductive member 135 is not provided. Thus, the conductive member 135 does not trigger a response in the touch panel 120 all around the outer circumferential surface 1323 of the rotary part 132, so that the position of the electrode 134 can be detected correctly.

Second Embodiment

Figure 5:
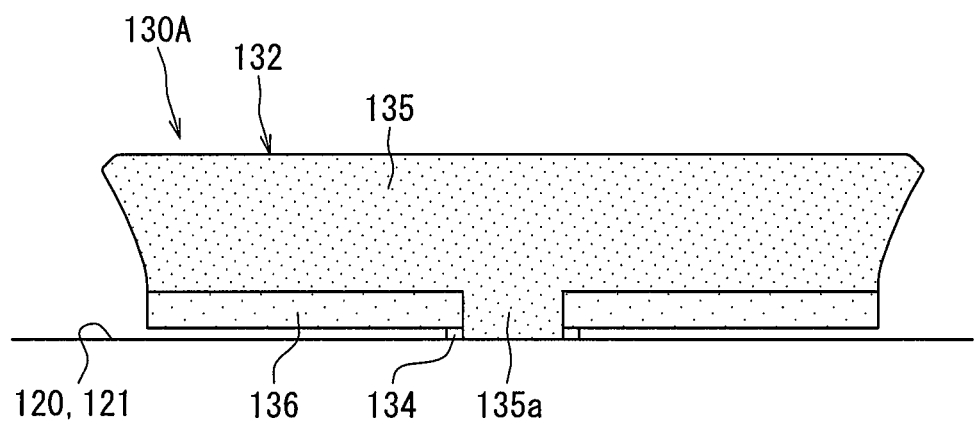
FIG. 5 is an external view showing a mechanical switch in a second embodiment.

A mechanical switch 130A of the second embodiment is shown in FIG. 5. In the second embodiment, as compared to the first embodiment, a non-conductive luster layer 136 having a luster similar to that of the conductive member 135 is provided on the non-coated area of the outer circumferential surface 1323 where the conductive member 135 is not provided. The luster layer 136 is formed by painting, for example. The non-coated area not provided with the conductive member 135 corresponds to a region other than the region provided with the coating of the conductive member of the present disclosure.

In this way, the non-coated area of the outer circumferential surface 1323 of the rotary part 132 not provided with the conductive member 135 can have an appearance similar to that of the region provided with the conductive member 135, so that the entire outer circumferential surface 1323 can have a consistent look. The non-conductive luster layer 136 may be provided such as to cover part of the conductive member 135.

Third Embodiment

Figure 6:
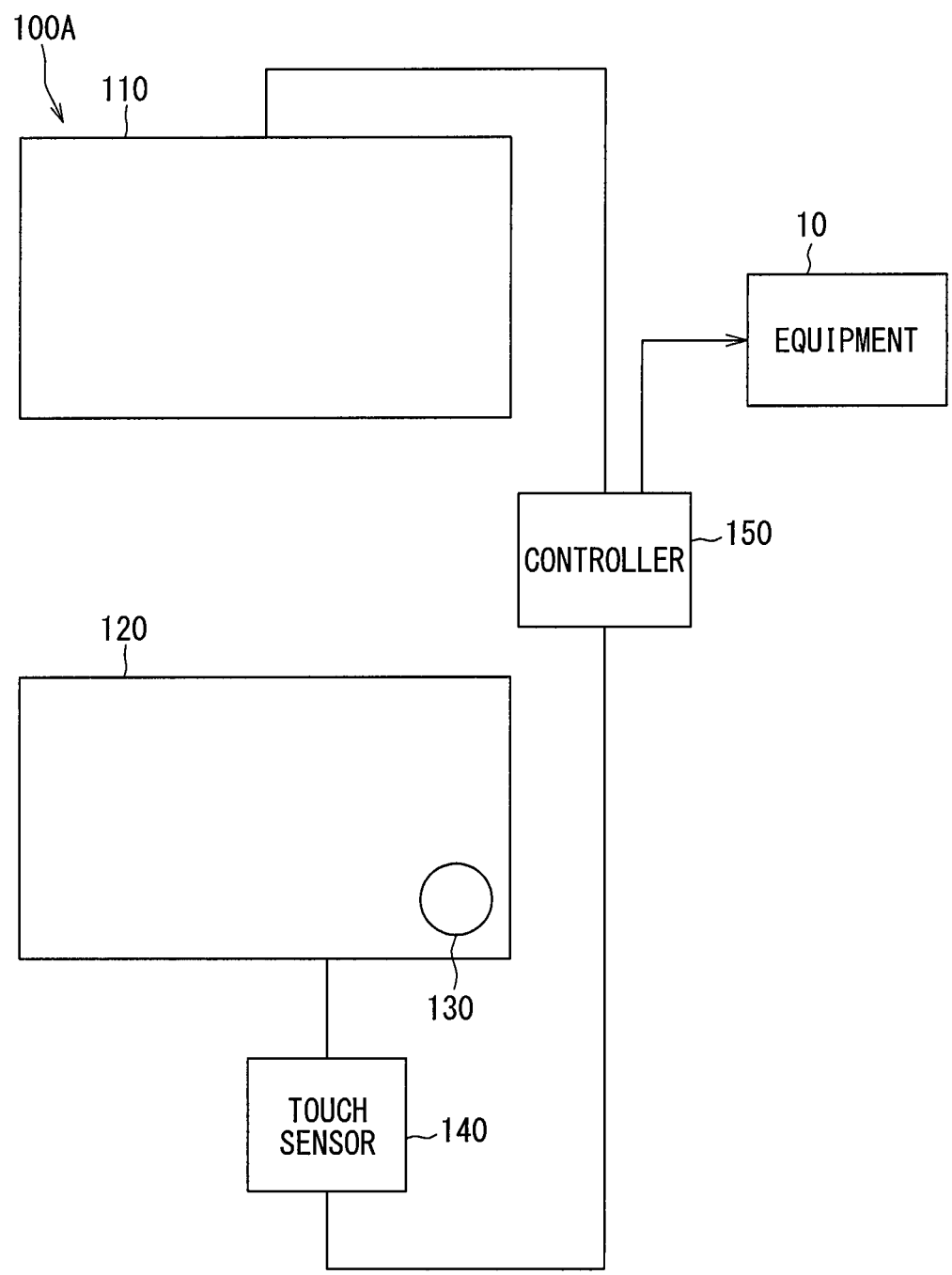
FIG. 6 is an illustrative diagram showing the entire structure of an operation device in a third embodiment.

An operation device 100A of the third embodiment is shown in FIG. 6. As compared to the operation device 100 of the first embodiment, the operation device 100A of the third embodiment has a touch panel 120 separately from a display 110 and located differently from the display 110.

The touch panel 120 of this embodiment is a device known as a touch pad provided at a position where the user can operate it more easily, e.g., a position adjacent to a shift lever in a center console of the vehicle. A mechanical switch 130 similar to that of the first embodiment is provided to the touch panel 120.

The same effects as those of the first embodiment can be achieved in this embodiment, too.

Fourth Embodiment

Figure 7:
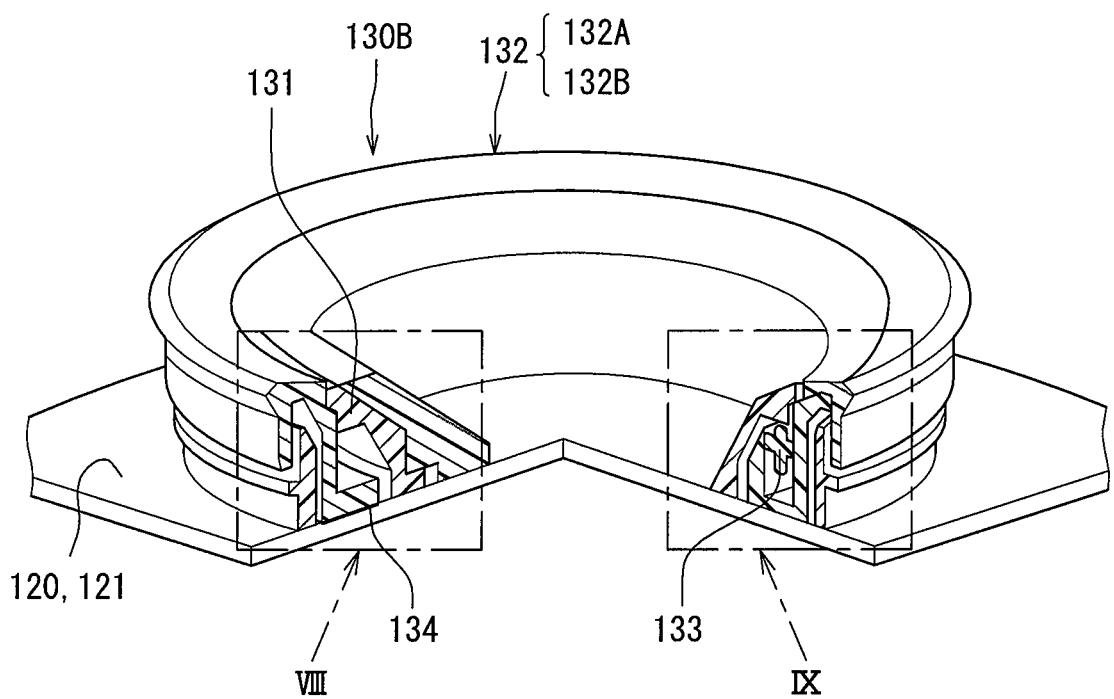
FIG. 7 is a cross-sectional perspective view showing the structure of a mechanical switch in a fourth embodiment.
Figure 8:
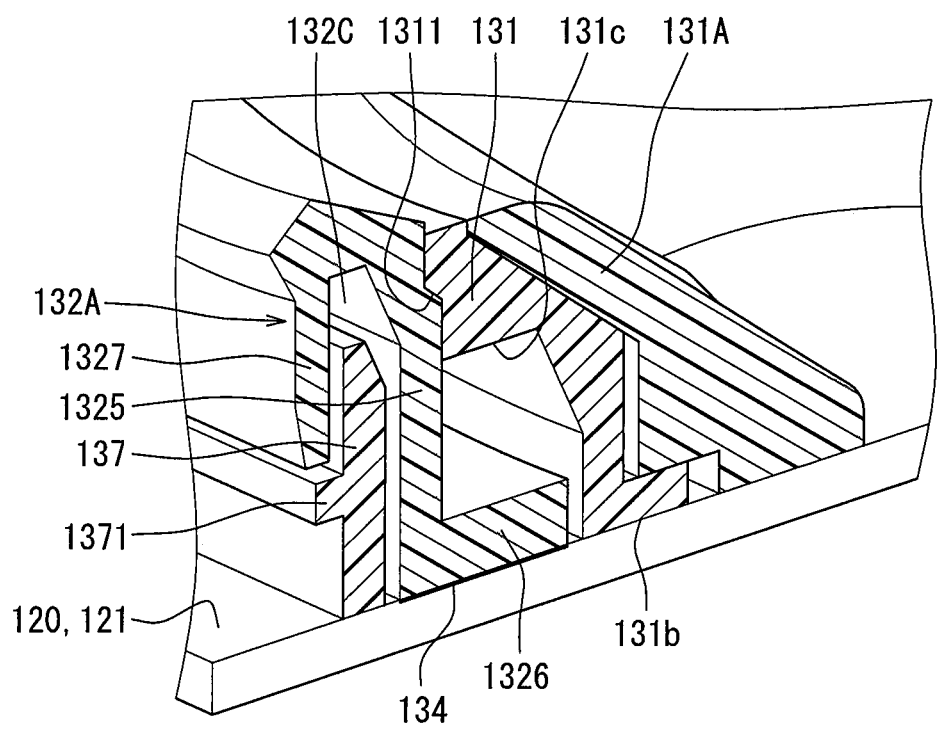
FIG. 8 is an enlarged view showing a part VIII in FIG. 7.
Figure 9:
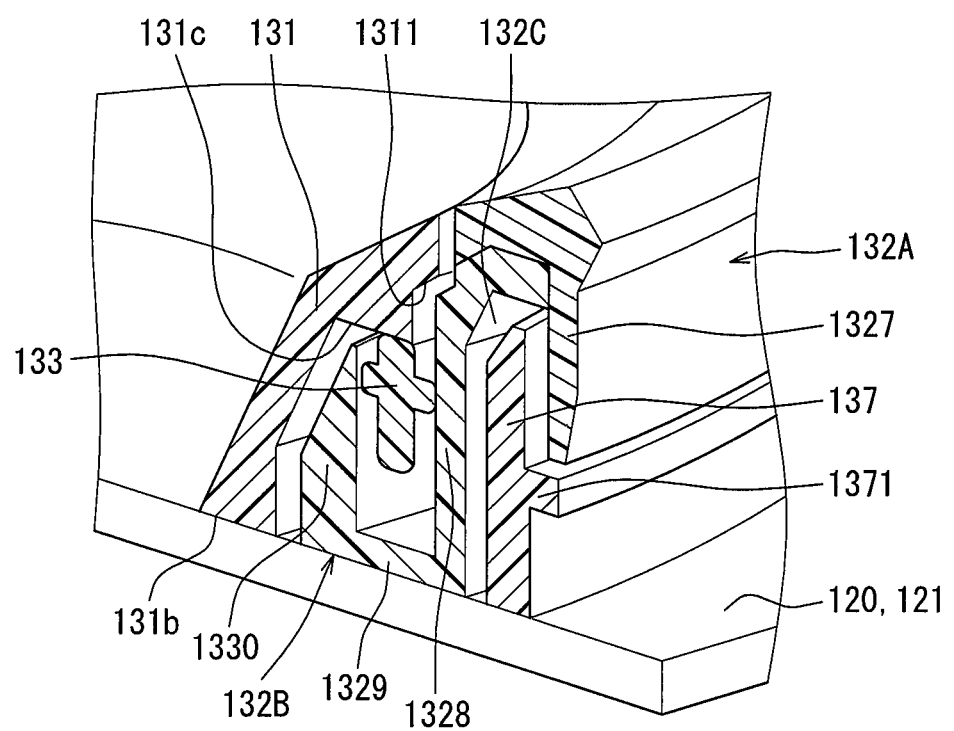
FIG. 9 is an enlarged view showing a part IX in FIG. 7.

A mechanical switch 130B of the fourth embodiment is shown in FIG. 7 to FIG. 9. In the fourth embodiment, as compared to the first embodiment, the shape of a fixed part 131 is changed, and a rotary part 132 is composed of two members. Further, a waterproof wall 137 is added.

The fixed part 131 is funnel-shaped as compared to the first embodiment so that the mechanical switch 130B has a hollow center, with a bottom face 131b fixedly attached to a touch surface 121. The fixed part 131 has a stepped part 1311 on the outer periphery (e.g., on the side facing the rotary part 132), this stepped part 1311 retaining the rotary part 132 to the fixed part 131 and supporting the rotary part such as to be rotatable relative to the touch surface 121.

The fixed part 131 has a portion corresponding to a click plate 131c described in the first embodiment integrally formed therewith. In FIG. 8 and FIG. 9, a portion corresponding to the click plate 131c is indicated with reference numeral 131c. The fixed part 131 also includes, on the radially inner side, an extended part 131A having a predetermined circumferential width and extended toward the center. A predetermined mark is provided to indicate a function (in other words, type) of the mechanical switch, for example, on one surface of the extended part 131A facing the user (e.g., opposite surface from the touch surface 121).

The rotary part 132 is made up of a first member 132A and a second member 132B. The first member 132A corresponds to a region provided with the coating of the conductive member 135 in the first embodiment, and the second member 132B corresponds to the region other than the region provided with the coating of the conductive member 135. The first member 132A is made of an ABS resin material, for example, with a coating of the conductive member 135 provided by plating. The second member 132B is made of a PC resin material, for example, and not provided with the coating of the conductive member 135 on the surface. The first member 132A and the second member 132B are integrally formed by two-color molding, for example.

The first member 132A includes a wall 1325, a bottom plate 1326, and a folded part 1327, as shown in FIG. 8. The wall 1325 stands upright from the touch surface 121 and is provided radially outward of the fixed part 131. The wall 1325 forms a portion of the outer circumferential surface of the rotary part 132.

The bottom plate 1326 is a plate-like portion extending from one end of the wall 1325 facing the touch surface 121 along the touch surface 121 toward the center of the rotary part 132. An electrode 134 is fixedly attached to a surface of the bottom plate 1326 facing the touch surface 121. The wall 1325 and bottom plate 1326 of the rotary part 132 have a same circumferential dimension as that of the electrode 134. The wall 1325 and the bottom plate 1326 form a section corresponding to the connector 135a in the first embodiment.

The folded part 1327 is a wall folded back at the end of the wall 1325 opposite from the touch surface 121 down to the touch surface 121 on the radially outer side of the rotary part 132, as shown in FIG. 8 and FIG. 9. The folded back distal end of the folded part 1327 extends as far as to the midpoint of the upright wall 1325. The folded part 1327 extends all around in a ring-like shape to form part of the outer circumferential surface of the rotary part 132 together with the wall 1325. A gap 132C is formed between the wall 1325 and the folded part 1327 for receiving the distal end of the waterproof wall 137 to be described later.

The second member 132B includes a wall 1328, a bottom plate 1329, and a folded part 1330, as shown in FIG. 9. The wall 1328 corresponds to the wall 1325 of the first member 132A, and is provided to a circumferential region of the rotary part 132 other than the wall 1325. The wall 1328 is a section that primarily forms the outer circumferential surface of the rotary part 132, together with the wall 1325.

The bottom plate 1329 is a plate-like portion extending from one end of the wall 1328 facing the touch surface 121 along the touch surface 121 toward the center of the rotary part 132.

The folded part 1330 is a wall formed by folding back an extended distal end of the bottom plate 1329 upright oppositely from the touch surface 121. The folded part 1330 is provided at a plurality of predetermined circumferential positions (here, two positions) of the rotary part 132. A click pin 133 is mounted in the space formed between the wall 1328 and the folded part 1330, and the distal end of the click pin 133 is in contact with the portion of the fixed part 131 corresponding to the click plate 131c.

The waterproof wall 137 is a flat tubular component provided radially outward of the rotary part 132 (e.g., walls 1325 and 1328) for preventing (in other word, protecting) the electrode 134 from getting wet, for example, by a spilt drink or the like. The waterproof wall 137 is made of a PC resin material, for example, and has a predetermined surface color (such as matte black). One axial end of the waterproof wall 137 is fixedly attached (e.g., bonded) to the touch surface 121 (e.g., touch panel 120). The other axial end of the waterproof wall 137 is inserted into the gap 132C of the rotary part 132. In a middle part in the axial direction of the waterproof wall 137, a protrusion 1371 projecting radially outward is formed all around. The protrusion 1371 is provided such as to be adjacent to the distal end of the folded part 1327.

There is a certain gap each between the protrusion 1371 and the distal end of the folded part 1327, between the waterproof wall 137 and the folded part 1327, and between the waterproof wall 137 and the walls 1325 and 1328, these gaps connected in a zig-zag shape from outside to the electrode 134. Namely, a maze of gaps between the other axial end of the waterproof wall 137 and the rotary part 132 forms a labyrinth structure, which corresponds to the gap 132C, the waterproof wall 137, and the protrusion 137I.

As described above, in this embodiment, the rotary part 132 is made up of the first member 132A provided with a coating of the conductive member 135, and the second member 132B not provided with a coating of the conductive member 135, so that parts can easily be sorted to those that need the conductive member 135 and those that do not, which facilitates formation of the rotary part 132.

Since the waterproof wall 137 is provided radially outward of the rotary part 132, the electrode 134 can be prevented from getting wet even when the user spills a drink or the like over the mechanical switch 130 during the drive, so that the inputting functions of the electrode 134 to the touch surface 121 will not be lost.

The waterproof wall 137 can have a predetermined surface color (here, matte black), to enhance the appearance of the mechanical switch 130B.

Other Embodiments

In the embodiments described above, the outer circumferential surface 131a of the fixed part 131 and the inner circumferential surface 1321 of the rotary part 132 have a shape that forms part of a cone with its outer diameter increasing in a direction away from the touch panel 120. Their shape is not limited to this. The fixed part 131 and rotary part 132 may be provided with position restrictors or the like to restrict their positions relative to each other, in which case they may have tubular outer circumferential surface 131a and inner circumferential surface 1321 parallel to the axial direction.

Input items to the predetermined equipment 10 based on the switch operations of the mechanical switch 130 are not limited to temperature settings or air volumes of a car air conditioner mentioned as examples. Various other options are possible, such as volumes of an audio device, for example.

While one mechanical switch 130 or 130A is provided to the touch panel 120 in the embodiments described above, the number of mechanical switches 130 or 130A to be provided is not limited to this and any necessary number of switches can be provided.

Optional aspects of the present disclosure will be set forth in the following clauses.

According to an aspect of the present disclosure, an operation device includes a touch panel that is configured to receive a touch operation by a finger of a user, and a mechanical switch that is configured to input a switch operation to the touch panel. The operation device allows an input operation to a predetermined equipment through the touch operation by the finger or the switch operation of the mechanical switch. The mechanical switch includes a fixed part fixed to the touch panel, a rotary part made of a non-conductive material and rotatably supported on the fixed part, an electrode provided on an opposing surface of the rotary part facing the touch panel, and a conductive member circumferentially coating an outer circumferential surface of the rotary part and connected to the electrode. The touch panel and the opposing surface are spaced apart with a predetermined gap or less. The conductive member is provided in a first region of the outer circumferential surface except for a region within a predetermined dimension from the opposing surface in a direction away from the touch panel. The conductive member is further provided in a second region of the outer circumferential surface extending from the first region and connected to the electrode.

According to the aspect of the present disclosure, the conductive member is provided in the first region and second region of the outer circumferential surface even when the gap between the opposing surface of the rotary part and the touch panel is set to be a predetermined value or less. That is, the region of a predetermined dimension on the outer circumferential surface except for the connector constitutes a non-coated area where the conductive member is not provided. Thus, the conductive member does not trigger a response in the touch panel all around the outer circumferential surface of the rotary part, so that the position of the electrode can be detected correctly.

Although the present disclosure is described based on the above embodiments, the present disclosure is not limited to the embodiments and the structures. Various changes and modification may be made in the present disclosure. Furthermore, various combination and formation, and other combination and formation including one, more than one or less than one element may be made in the present disclosure.

What is claimed is:

1. An operation device comprising:
a touch panel that is configured to receive a touch operation by a finger of a user; and
a mechanical switch that is configured to input a switch operation to the touch panel, wherein
the operation device allows an input operation to a predetermined equipment through the touch operation by the finger or the switch operation of the mechanical switch,
the mechanical switch includes:
a fixed part fixed to the touch panel;
a rotary part made of a non-conductive material and rotatably supported on the fixed part;
an electrode provided on an opposing surface of the rotary part facing the touch panel; and
a conductive member circumferentially coating an outer circumferential surface of the rotary part and connected to the electrode,
the touch panel and the opposing surface are spaced apart with a predetermined gap or less,
the conductive member is provided in a first region of the outer circumferential surface except for a region within a predetermined dimension from the opposing surface in a direction away from the touch panel, and
the conductive member is further provided in a second region of the outer circumferential surface extending from the first region and connected to the electrode.

2. The operation device according to claim 1, further comprising
a non-conductive luster layer that is provided in a region of the outer circumferential surface other than a region coated by the conductive member, wherein
the non-conductive luster layer has a first luster and the conductive member has a second luster, and
a difference between the first luster and the second luster is within a predetermined range.

3. The operation device according to claim 1, wherein the rotary part includes:
a first member corresponding to a region of the outer circumferential surface coated by the conductive member; and
a second member corresponding to a region of the outer circumferential surface other than the region coated by the conductive member.

4. The operation device according to claim 1, further comprising
- a waterproof wall having a tubular shape and provided radially outward of the rotary part, wherein
- the waterproof wall has one axial end fixed to the touch panel so as to protect the electrode from getting wet.

5. The operation device according to claim 4, further comprising
- a labyrinth structure having a maze of a gap formed between another axial end of the waterproof wall and the rotary part.

* * * * *